Patented Nov. 11, 1952

2,617,794

UNITED STATES PATENT OFFICE 2,617,794

METHOD OF PREPARING AMIDES

George W. Anderson, Darien, Conn., assignor to American Cyanamid Company, New York, N. Y., a corporation of Maine No Drawing. Application December 1, 1950, Serial No. 198,729

14 Claims. (Cl. 260—112)

This invention relates to a new method of organic synthesis, and more particularly, to a new method of preparing substituted amides and peptides.

Although there are many methods available for preparing substituted amides, none have proved quite satisfactory in all instances. It is an object of this invention to make available a new method for preparing substituted amides which overcomes many of the difficulties of the prior art. A further object of this invention is to make available a method of preparing amides containing sensitive groups which ordinarily interfere with the synthesis of amides. Another object of this invention is to make available a method of preparing substituted amides from optically active components without undue racemization.

The new method of this invention broadly comprises reacting a carboxylic acid with a diesterphosphiteamide such as may be represented by the following formula:

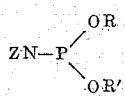

in which ZN is a radical obtained from an amine and R and R' are nonfunctional esterifying radicals. The diesterphosphiteamides are also referred to in the specification and claims as aminophosphites.

Aminophosphites prepared from aminoacid derivatives constitute the subject matter of my co-pending application, S. N. 198,730, filed concurrently herewith and may be prepared by the procedure set forth in detail therein.

Similar aminophosphites may be prepared by the same procedure from any amine having amine hydrogen and a dissociation constant greater than $1 \times 10^{-13}$ at 25° C. Other procedures for preparing the aminophosphites are set forth in detail in the examples to follow.

The term "nonfunctional esterifying radical" is used to signify an organic radical which does not enter into the usual chemical reactions of the aminophosphite and the variation of which does not materially affect the chemical properties of the aminophosphite. Examples of suitable radicals may be illustrated by the following: aromatic such as phenyl, napthyl, chlorophenyl, nitrophenyl; aliphatic such as ethyl, propyl, butyl, chlorobutyl, and the like; etc. One skilled in the art of organic synthesis should have little difficulty choosing suitable radicals for R and R'.

The reaction by which substituted amides are prepared according to the process of this invention may be represented by the following general equation:

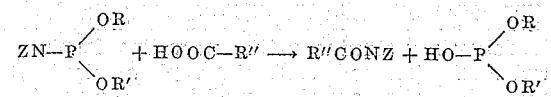

in which R'' is an organic radical. It may be seen from the above equation that the method is a general one suitable for the preparation of many mono and disubstituted amides.

While an aminophosphite may be prepared from any primary or secondary amine having a dissociation constant greater than $1 \times 10^{-13}$ at 25° C., only certain of the aminophosphites may be employed in the process of this invention. Suitable aminophosphites are those made from the weakly basic amines; i. e., amines having a dissociation constant at 25° C. of less than $1 \times 10^{-5}$. Aminophosphites prepared from amines having a dissociation constant at 25° C. between $1 \times 10^{-6}$ and $1 \times 10^{-11}$ are preferred. Amines from which suitable aminophosphites can be prepared may be specifically illustrated by the following: aromatic amines such as aniline, naphthylamine, o-chloroaniline, N-methylaniline, N-benzylaniline, o-carbethoxyaniline, toluidine, 2,4-dibromo-6-nitroaniline, and the like; amines having an α-carbalkoxy group such as N-methyl phenylalanine ethyl ester and the like; etc.

Any dibasic or polybasic carboxylic acid is suitable for the process of this invention. The following specific examples may be given by way of illustration: aliphatic carboxylic acids such as acetic acid, propionic acid, butyric acid, caproic acid, stearic acid, oleic acid, and the like; substituted aliphatic acids such as mono chloracetic acid, and the like; polybasic acids such as succinic acid, adipic acid, and the like; aromatic acids such as benzoic, naphthalic, and the like; heterocyclic acids such as nicotinic, thiophene carboxylic, and the like; alicyclic acids such as naphthenic; etc. When dibasic acids are employed in the process, either the monoamide or the diamide may be prepared depending upon the number of molecular equivalents of aminophosphite used.

The method of this invention is of particular interest in the preparation of amides from derivatives of the naturally occurring aminoacids. According to many of the methods of the prior art, when amides were made from the optically active acids, a large amount of racemization occurred, but by the method of this invention very little difficulty is encountered. The aminoacid derivative may constitute either the amine from which the aminophosphite is formed or the carboxylic acid which is reacted with the aminophosphite to form the substituted amide.

In making aminophosphites in which the amine group is to be furnished by an aminoacid, the carboxy group of the aminoacid should be blocked to prevent side reactions. Likewise, in the synthesis of peptides where the aminophosphite is to be reacted with the carboxy group of an aminoacid, the amine group of the aminoacid should be blocked to prevent the formation of zwitter-ions. The procedure of blocking a reactive group is well known in the art and in the case of carboxy groups may be done by esterification or the equivalent and in the case of amine groups may be done by acylation or the equivalent. Aminoacids in which a reactive group has been blocked are referred to in this specification as aminoacid derivatives.

Illustrative of the naturally occurring aminoacids the derivatives of which are of particular interest in connection with this invention are the following: alanine, valine, norvaline, leucine, norleucine, isoleucine, isovaline, phenylalanine, tyrosine, serine, cysteine, methionine, aspartic acid, glutamic acid, lysine, ornithine, asparagine, citrulline, histidine, tryptophane, proline, and hydrooxyproline. Generally speaking these aminoacids are alpha aminoacids having from two to twelve carbon atoms.

The method offers a very convenient means of preparing long chain polypeptides. For instance, the dipeptide ester derivative may be prepared by reacting an acylated aminoacid with an aminophosphite formed from an aminoacid ester. The ester group of the dipeptide may then be removed to form the free acid which is then reacted with more aminophosphite to form the tripeptide ester and so on.

The reaction is preferably performed in an inert solvent. Suitable inert solvents may be illustrated by the following: aromatic hydrocarbons such as toluene, xylene, etc.; aliphatic hydrocarbons such as normal octane, etc.; chlorinated hydrocarbons, such as chloroform, carbon tetrachloride, chlorobenzene, etc.; aliphatic ethers such as ethyl ether and the like; cyclic ethers such as dioxane; and with less satisfactory results, aliphatic ketones such as dibutyl ketone and aliphatic esters, such as ethyl acetate, etc. Choice of solvent will depend primarily upon the solubility of the reactants therein and upon convenience. The aromatic hydrocarbons are preferred. When an inert solvent is employed, the aminophosphite may be formed in situ without the need of isolation.

The reaction may be carred out at room temperature or at any other temperature below the decomposition point of the reactants or reaction product. Usually, however, one is limited as a matter of convenience to the reflux temperature of the solvent employed and temperatures in the range of 40–110° C. are preferred. The reaction proceeds at room temperature and is substantially complete within forty-eight hours. The reaction is usually complete in about thirty minutes to one hour at 110° C., and in a proportional length of time at intermediate temperatures.

The reaction will be more particularly illustrated by means of the following specific examples:

Example I

Diethylanilinophosphite (3.07 g.), prepared by the method of Cook et al. (J. Chem. Soc., 1949, 2925) and carbobenzoxyglycine (3.00 g.) are dissolved together in 50 cc. of hot anhydrous toluene and the solution refluxed for an hour. Carbobenzoxyglycylanilide separates as crystals on cooling and chilling; yield: 2.95 g. A further 0.15 g. is obtained by evaporation of the filtrate and treatment of the residue with 50% alcohol, making the total yield 76%. By recrystallization from 50% alcohol the melting point is raised from 144–145° C. to 147–148° C.

Example II

Diethylanilinophosphite (0.50 g.) and carbobenzoxy-DL-phenylalanine (0.70 g.) are dissolved in 30 cc. of toluene and the solution refluxed for one hour. Cooling results in the crystallization of 0.63 g. (72% of the theoretical) of carbobenzoxy-DL-phenylalanineanilide, melting point about 158–160° C.

Example III

Example II is repeated, using the levorotary form of carbobenzoxyphenylalanine. A yield of 37% of carbobenzoxy-L-phenylalanineanilide is obtained. Recrystallization from alcohol-water and chloroform-petroleum ether gives colorless crystals, melting point 173–174° C. The optical rotation of a 3% solution in chloroform was found to be $[\alpha]_D^{26} = -5.4$.

Example IV

One part by weight of diethylchlorophosphite is dissolved in about 10 volumes of anhydrous ether. The solution is chilled by means of an ice water bath and to the chilled solution is added one molecular equivalent of DL-phenylalanine ethyl ester and one molecular equivalent of triethylamine. After allowing the mixture to warm to room temperature, the precipitate of triethylamine hydrochloride is removed by filtration and the diethyl-$\alpha$-carbethoxy-$\beta$-phenylethylaminophosphite obtained as a colorless oil by distillation of the ether solvent.

In 25 cc. of anhydrous toluene there is dissolved 3.7 millimols (1.17 g.) of diethyl-$\alpha$-carbethoxy-$\beta$-phenylethylaminophosphite and 3.7 millimols (0.78 g.) of carbenzoxyglycine and the solution is refluxed for one hour. The toluene solvent is then removed by distillation in vacuo and the residual oil dissolved in 5 cc. of alcohol. Carbobenzoxyglycylphenylalanine ethyl ester is crystallized from the alcohol solution by the gradual addition of water; yield 1.24 g. (86% of the theoretical). Recrystallization from 25 cc. of 50% alcohol yields 0.93 g. of purified crystals; melting point 90–91° C.

Example V

Example IV is repeated, but using ordinary (wet) toluene as solvent. Again a 65% yield of pure product was obtained.

Example VI

Example IV is repeated, but using ethyl acetate as a solvent. A 24% yield is obtained.

Example VII

Example IV is repeated, except that chloroform is used as a solvent and the solution is allowed to stand twenty-four hours at room temperature instead of heating. The solvent is removed at room temperature by vacuum distillation to obtain a 17% yield of the crude product; melting point 75-80° C.

Example VIII

Example IV is repeated, but the solution is refluxed half an hour instead of an hour. Yield: 58% of recrystallized product.

Example IX

Example IV is repeated using one molecular equivalent of dibutyl chlorophosphite in place of the diethyl chlorophosphite of Example IV. Carbobenzoxyglycylphenylalanine ethyl ester is obtained in equally good yield.

Example X

Example IV is repeated with one molecular equivalent of diphenyl chlorophosphite in place of the diethyl chlorophosphite of Example IV. Carbobenzoxyglycylphenylalanine ethyl ester is obtained in equally good yield.

Example XI

Example IV is repeated using one molecular equivalent of o-phenylene chlorophosphite in place of the diethyl chlorophosphite. Again, carbobenzoxyglycylphenylalanine ethyl ester is obtained in good yield.

Example XII

Glycine (.01 mol) and diethyl-DL-$\alpha$-carbethoxy-$\beta$-phenylethyl-aminophosphite (.01 mol) are mixed together and dry hydrogen chloride bubbled through the mixture until it becomes quite hot. After allowing the mixture to cool to room temperature, 30 cc. of absolute alcohol are added and then evaporated off on a steam bath. The residue is taken up in dilute sodium bicarbonate solution and extracted with either to remove phenylalanine ester by-product. The solution is made strongly basic with sodium hydroxide and further extracted with ether. This ether solution is dried and the hydrochloride of glycyl-DL-phenylalanine ethyl ester precipitated as a gum by bubbling in dry hydrogen chloride. Several precipitations from absolute alcohol solution with ether gives colorless crystals; melting point 160-162° C.

Example XIII

One part by weight of dibutylchlorophosphite is dissolved in about ten volumes of anhydrous ether. The solution is chilled by means of an ice water bath and to the chilled solution is added one molecular equivalent of 2-chloroaniline and one molecular equivalent of triethylamine. After allowing the mixture to warm to room temperature, the precipitate of triethylamine hydrochloride is removed by filtration and the dibutyl-2-chloroanilinophosphite obtained by distillation of the ether solvent.

To 5 cc. of glacial acetic acid there is added 2.2 g. of dibutyl-2-chloroanilinophosphite, and the mixture refluxed for thirty minutes. The excess acid is removed by heating on a steam bath under vacuum and the residual oil poured into 20 cc. of water. The crystalline o-chloroacetanilide which forms is removed by ether extraction. The ether extract is dried and the o-chloroacetanilide precipitated by the addition of petroleum ether. The thus purified crystals have a melting point of 86-87° C.

Example XIV

A mixture of diethylanilinophosphite (2.1 g.) and acetic acid (5 cc.) is refluxed for thirty minutes. The product is isolated as in Example XIII. A yield of 0.73 g. of acetanilide is obtained having a melting point of 112-113° C.

Example XV

In 15 cc. of toluene there is dissolved 2.13 g. of diethylanilinophosphite and 1.22 g. of benzoic acid and the solution refluxed for two hours. On cooling, part of the benzanilide crystallizes, and the remainder is obtained by evaporation of the solvent. A yield of 1.63 g. of benzanilide is obtained having a melting point of 156-160° C.

Example XVI

To 5 cc. of acetic acid there is added 2.6 g. of DL-phenylalaninophosphite ester and the mixture refluxed for three hours. The excess acid is removed by distillation under vacuum and the resulting product taken up in ether. After washing with sodium bicarbonate solution and concentrating by distillation, the N-acetyl-DL-phenylalanine ethyl ester is precipitated by petroleum ether. After recrystallization from ether-petroleum ether the product has a melting point of 57-58° C.

Example XVII

Example I is repeated, using dimethyl formamide as a solvent in place of toluene. A yield of 24% of recrystallized carbobenzoxyglycineanilide is obtained.

Example XVIII

In 30 cc. of chloroform there is dissolved 2.13 g. of diethylanilinophosphite and 2.45 g. of phthalyl-DL-$\beta$-phenylalanine and the solution refluxed for one and one-half hours. The chloroform solvent is removed by evaporation and the resulting yellow oil washed with petroleum ether to obtain crystalline phthalyl-DL-$\beta$-phenylalanineanilide. After recrystallization from absolute alcohol the product has a melting point of 208-209° C.

I claim:

1. A method of preparing substituted amides which comprises reacting a carboxylic acid with a diesterphosphiteamide of an amine having a dissociation constant at 25° C. of about $1 \times 10^{-5}$ to $1 \times 10^{-13}$ said carboxylic acid having no amide-forming acid radical other than carboxyl.

2. A method of preparing substituted amides which comprises reacting in an inert organic solvent at a temperature of from 0° C. to 140° C. a carboxylic acid with a diesterphosphiteamide of an aminoacid ester having a dissociation constant at 25° C. of $1 \times 10^{-6}$ to $1 \times 10^{-11}$ said carboxylic acid having no amide-forming acid radical other than carboxyl.

3. The method of claim 2 when said diesterphosphiteamide is o-phenylene-alpha-carbethoxy-beta-phenylethylaminophosphite.

4. A method of preparing substituted amides which comprises reacting in an inert organic solvent at a temperature from 0° C to 140° C., an alpha-acidamidocarboxylic with a diesterphosphiteamide of an amine having a dissociation constant at 25° C. of from $1 \times 10^{-6}$ to $1 \times 10^{-11}$.

5. The method of claim 4 when said acidamidocarboxylic acid is a derivative of glycine.

6. The method of claim 4 when said acidamidocarboxylic acid is a derivative of phenylalanine.

7. A method of preparing carbobenzoxyglycylanilide which comprises reacting carbobenzoxyglycine in an inert organic solvent at a temperature of 40° C. to 115° C., with diethylanilinophosphite.

8. A method of preparing carbobenzoxyphenylalanineanilide which comprises reacting carbobenzoxyphenylalanine in an inert organic solvent at a temperature of 40° C. to 115° C., with diethylanilinophosphite.

9. A method of preparing optically active substituted amides which comprises reacting an optically active alpha-acidamidocarboxylic acid in an inert organic solvent, with a diesterphosphiteamide of an amine having a dissociation constant at 25° C. of $1 \times 10^{-6}$ to $1 \times 10^{-11}$.

10. The process of claim 9 when said optically active alpha-acidamidocarboxylic acid is carbobenzoxy-L-phenylalanine and said diesterphosphiteamide is diethylanilinophosphite.

11. A method of preparing peptide derivatives which comprises reacting in an inert organic solvent at a temperature of from 40° C. to 115° C., an alpha-acidamidocarboxylic acid with a diesterphosphiteamide of an aminoacid ester having a dissociation constant at 25° C. of $1 \times 10^{-6}$ to $1 \times 10^{-11}$.

12. A method of preparing peptide derivatives which comprises reacting in an inert organic solvent at a temperature of from 40° C. to 115° C., an acidamidoacetic acid with a diesterphosphiteamide of an aminoacid ester having a dissociation constant at 25° C. of $1 \times 10^{-6}$ to $1 \times 10^{-11}$.

13. The method of claim 12 when said acidamidoacetic acid is carbobenzoxyglycine and said diesterphosphiteamide is diethyl-alpha-carbethoxy-beta-phenylethylaminophosphite.

14. The method of claim 12 when said acidamidoacetic acid is carbobenzoxyglycine and said diesterphosphiteamide is o-phenylene-alpha - carbethoxy - beta - phenylethylaminophosphite.

GEORGE W. ANDERSON.

REFERENCES CITED

The following references are of record in the file of this patent:

UNITED STATES PATENTS

| Number | Name | Date |
| --- | --- | --- |
| 2,371,736 | Carson | Mar. 20, 1945 |
| 2,508,860 | Grimmel et al. | May 23, 1950 |
| 2,509,594 | Guenther et al. | May 30, 1950 |